US012623519B2

(12) United States Patent
Tsushima et al.

(10) Patent No.: US 12,623,519 B2
(45) Date of Patent: May 12, 2026

(54) VEHICLE DOOR STRUCTURE

(71) Applicant: SUBARU CORPORATION, Tokyo (JP)

(72) Inventors: Kuniyoshi Tsushima, Tokyo (JP); Chikara Yamashita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 452 days.

(21) Appl. No.: 18/387,216

(22) Filed: Nov. 6, 2023

(65) Prior Publication Data

US 2024/0190222 A1     Jun. 13, 2024

(30) Foreign Application Priority Data

Dec. 7, 2022     (JP) ................................. 2022-195954

(51) Int. Cl.
*B60J 5/04* (2006.01)
*B60J 10/25* (2016.01)
*E06B 7/14* (2006.01)

(52) U.S. Cl.
CPC ............. *B60J 5/0402* (2013.01); *B60J 10/25* (2016.02); *E06B 7/14* (2013.01)

(58) Field of Classification Search
None
See application file for complete search history.

(56) References Cited

U.S. PATENT DOCUMENTS

| | | | | |
|---|---|---|---|---|
| 2,747,922 A | * | 5/1956 | Gibson | B60J 10/80 49/374 |
| 4,445,721 A | * | 5/1984 | Yaotani | B60R 13/07 49/476.1 |
| 4,492,405 A | * | 1/1985 | Chikaraishi | B60R 13/07 296/213 |
| 4,728,145 A | * | 3/1988 | Benedetto | B60J 10/25 296/213 |
| 5,449,217 A | * | 9/1995 | Takahashi | E06B 7/14 49/476.1 |
| 6,430,878 B2 | * | 8/2002 | Terasawa | B60R 13/07 49/416 |
| 7,762,021 B2 | * | 7/2010 | Fujiwara | B60J 5/0402 49/440 |

(Continued)

FOREIGN PATENT DOCUMENTS

| | | | | |
|---|---|---|---|---|
| DE | 3809196 A1 | * | 9/1989 | B62D 25/07 |
| DE | 19501292 A1 | * | 7/1996 | B60R 13/07 |

(Continued)

*Primary Examiner* — Catherine A Kelly
(74) *Attorney, Agent, or Firm* — McGinn IP Law Group, PLLC

(57) ABSTRACT

A vehicle door structure includes a door sash part and a sash retainer. A paint sealer is applied to a periphery of a vehicle lower side of the sash retainer continuously without a gap from an inner side to an outer side in a vehicle width direction through a vehicle lower portion so as to close a space between the sash retainer and the door sash part. The door sash part has a region that is lower than an application upper end of the paint sealer, that has both sides in the vehicle width direction and a vehicle lower side that are surrounded by the paint sealer, that is disposed in surface-to-surface contact with the sash retainer. A drain hole configured to drain liquid is provided on the region.

1 Claim, 4 Drawing Sheets

(56)     References Cited

U.S. PATENT DOCUMENTS

| | | | | |
|---|---|---|---|---|
| 8,434,813 B2 * | 5/2013 | Mori | ....................... | B60R 13/07 |
| | | | | 296/93 |
| 8,955,901 B2 * | 2/2015 | Yamada | ................. | B21D 19/08 |
| | | | | 49/502 |
| 8,979,167 B2 * | 3/2015 | Shimizu | ................. | B60J 5/0402 |
| | | | | 49/502 |
| 8,979,168 B2 * | 3/2015 | Ohsawa | ................... | B60J 10/76 |
| | | | | 296/146.5 |
| 9,168,813 B2 * | 10/2015 | Kasuya | ................... | B60J 10/86 |
| 9,566,850 B2 * | 2/2017 | Inai | ......................... | B60J 10/25 |
| 9,649,922 B2 * | 5/2017 | Amagai | ................. | B60J 10/25 |
| 10,081,230 B2 * | 9/2018 | Noguchi | ................. | B60J 10/32 |
| 10,232,693 B1 * | 3/2019 | Williams | ................. | B60J 10/25 |
| 10,626,665 B2 * | 4/2020 | Amagai | ................. | E06B 7/2309 |
| 11,123,815 B2 * | 9/2021 | Yoshihara | .......... | B23K 11/0026 |
| 11,376,938 B2 * | 7/2022 | Morihara | ................. | B60J 10/21 |
| 2022/0250456 A1 * | 8/2022 | Zia | ........................ | F16J 15/106 |
| 2024/0116336 A1 * | 4/2024 | Kanai | ..................... | B60J 10/76 |

FOREIGN PATENT DOCUMENTS

| | | | | | |
|---|---|---|---|---|---|
| JP | 2000-108664 A | | 4/2000 | | |
| JP | 2002002270 A | * | 1/2002 | .............. | B60J 10/25 |
| JP | 2022114910 A | * | 8/2022 | .............. | B60J 10/86 |
| KR | 0134141 B1 | * | 4/1998 | .............. | B60J 10/75 |
| KR | 20100048166 A | * | 5/2010 | .............. | B60J 10/15 |
| WO | WO-2010001685 A1 | * | 1/2010 | ........... | B60J 5/0402 |
| WO | WO-2013125015 A1 | * | 8/2013 | ........... | B60J 5/0402 |

* cited by examiner

VEHICLE DOOR STRUCTURE

CROSS-REFERENCE TO RELATED APPLICATIONS

The present application claims priority from Japanese Patent Application No. 2022-195954 filed on Dec. 7, 2022, the entire contents of which are hereby incorporated by reference.

BACKGROUND

The disclosure relates to a vehicle door structure.

In general, a door with a sash in which a sash surrounding a door glass is attached to a vehicle upper portion of a door body in which a door outer panel and a door inner panel are joined is widely used as a vehicle door. In this type of door, a weather strip or the like is attached between the sash and the vehicle body in order to prevent entry of rainwater or the like from the outside when the door is closed. The weather strip is in close contact with the space between the sash and the vehicle body to prevent intrusion of water droplets or the like from the outside.

Further, the sash is formed by joining a sash outer and a sash inner, and a glass run attachment channel to which a glass run that slidably guides a door glass is attached, a weather strip attachment channel (retainer) to which a weather strip is attached, or the like is integrally formed with or joined to the sash.

By the way, since the sash outer and the sash inner are joined to each other, dew condensation generated by a change in air temperature or the like, water droplets or the like entering from a connecting portion or the like may stay in a hollow portion formed in the inside surrounded by the sash outer and the sash inner. Accordingly, there is a possibility that rust is generated inside the sash and moisture containing rust leaks out from the inside of the sash and stains an external appearance surface of a vehicle body or the like.

For this reason, for example, Japanese Unexamined Patent Application Publication (JP-A) No. 2000-108664) discloses a technology having a front sash and a rear sash in which a sash outer panel and a sash inner panel are overlapped with each other, and a lower part in a hollow cross-sectional part S formed by a sash outer and a sash inner communicates with the inside of the door body via a communication passage to thereby discharge moisture so that dew condensation or water or the like having entered the inside of the sash is quickly discharged without staying therein, and rusting in the sash is suppressed (see, for example, JP-A No. 2000-108664).

SUMMARY

An aspect of the disclosure provides a vehicle door structure. The vehicle door structure includes a door sash part and a sash retainer. The door sash part is provided to surround a door window unit in a vehicle upper portion of a door of a vehicle. The sash retainer extends in a vehicle upper-lower direction and a vehicle width direction of the vehicle. The sash retainer is fixed to the door sash part and has a surface that contacts with a surface of the door sash part. The sash retainer is configured to hold a weather strip part that prevents liquid from entering an inside of the vehicle more than the vehicle door from an outside of the vehicle in the vehicle width direction. A paint sealer is applied to a periphery of a vehicle lower side of the sash retainer continuously without a gap from an inner side of the periphery in the vehicle width direction to an outer side of the periphery in the vehicle width direction through a vehicle lower portion of the periphery in such a manner as to close a space between the sash retainer and the door sash part. The door sash part has a region that is lower than an application upper end of the paint sealer, that has both sides in the vehicle width direction and a vehicle lower side that are surrounded by the paint sealer, that is disposed in surface-to-surface contact with the sash retainer. A drain hole is configured to drain liquid is provided on the region.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
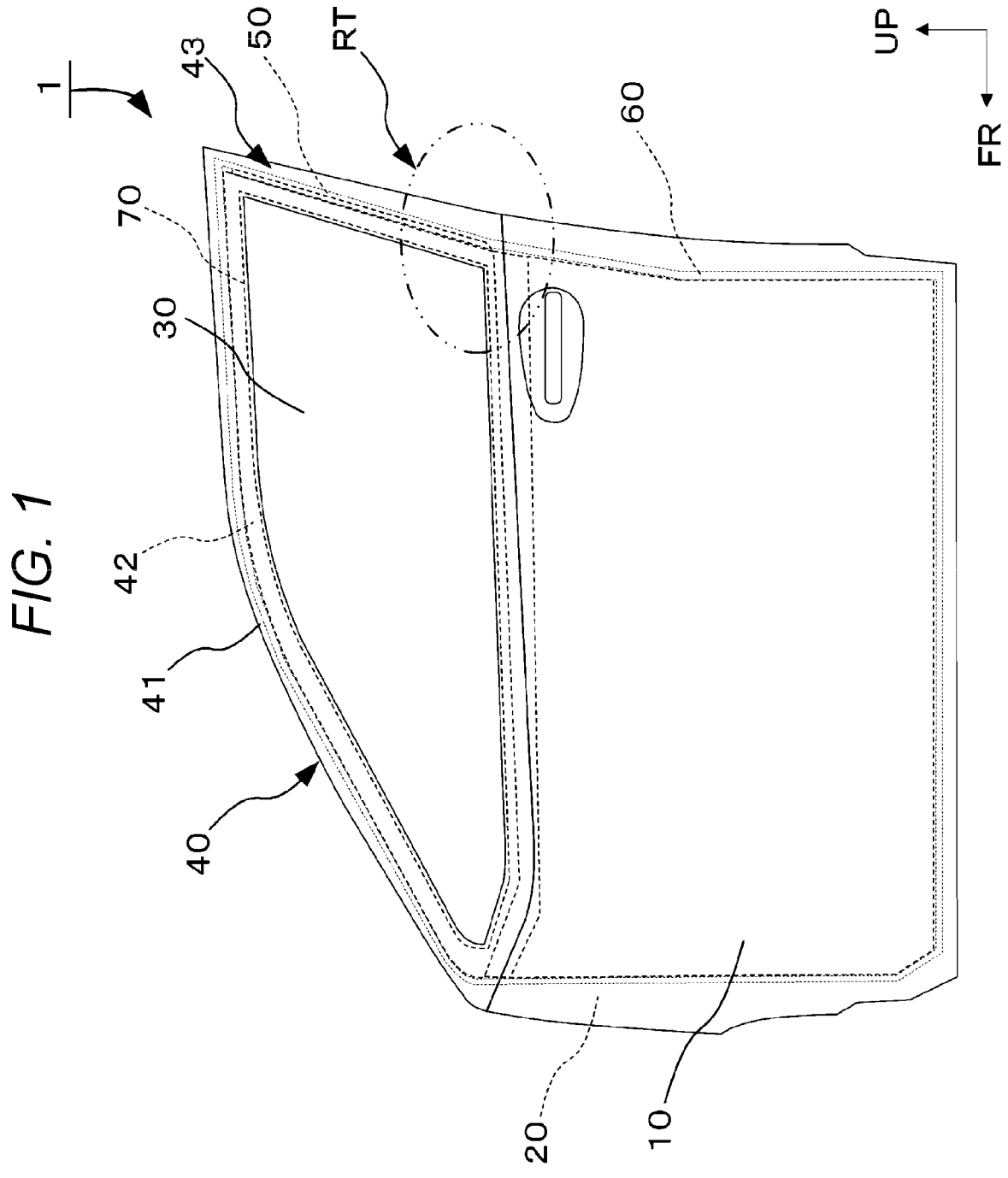
FIG. 1 is a schematic configuration view of a vehicle door according to an embodiment of the disclosure as viewed from outside in a vehicle width direction.

The technology described in JP-A No. 2000-108664 has a problem that a discharge path is not secured for moisture or the like that has entered between plates of a sash outer and a sash inner, a weather strip attachment channel (retainer), or the like, and when a lower end of a joint in a lower part of the vehicle is open, what is called rust water leaks out, which may stain an external appearance surface of a vehicle body or the like.

It is desirable to provide a vehicle door structure that prevents rust water from flowing out to an external appearance surface in a door sash part.

Hereinafter, a vehicle door 1 according to an embodiment of the disclosure will be described with reference to FIGS. 1 to 4. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that an arrow FR illustrated as appropriate in the drawings indicates the front (front face) of a vehicle V to which the vehicle door 1 is attached, an arrow UP indicates the upper side in front view, and an arrow LH indicates the left side in front view. In addition, in the following description, upper-lower, front-rear, and left-right directions indicate an upper-lower direction in front view, a front-rear direction in front view, and a left-right direction in front view of the vehicle V unless otherwise specified.

Embodiment

Figure 2:
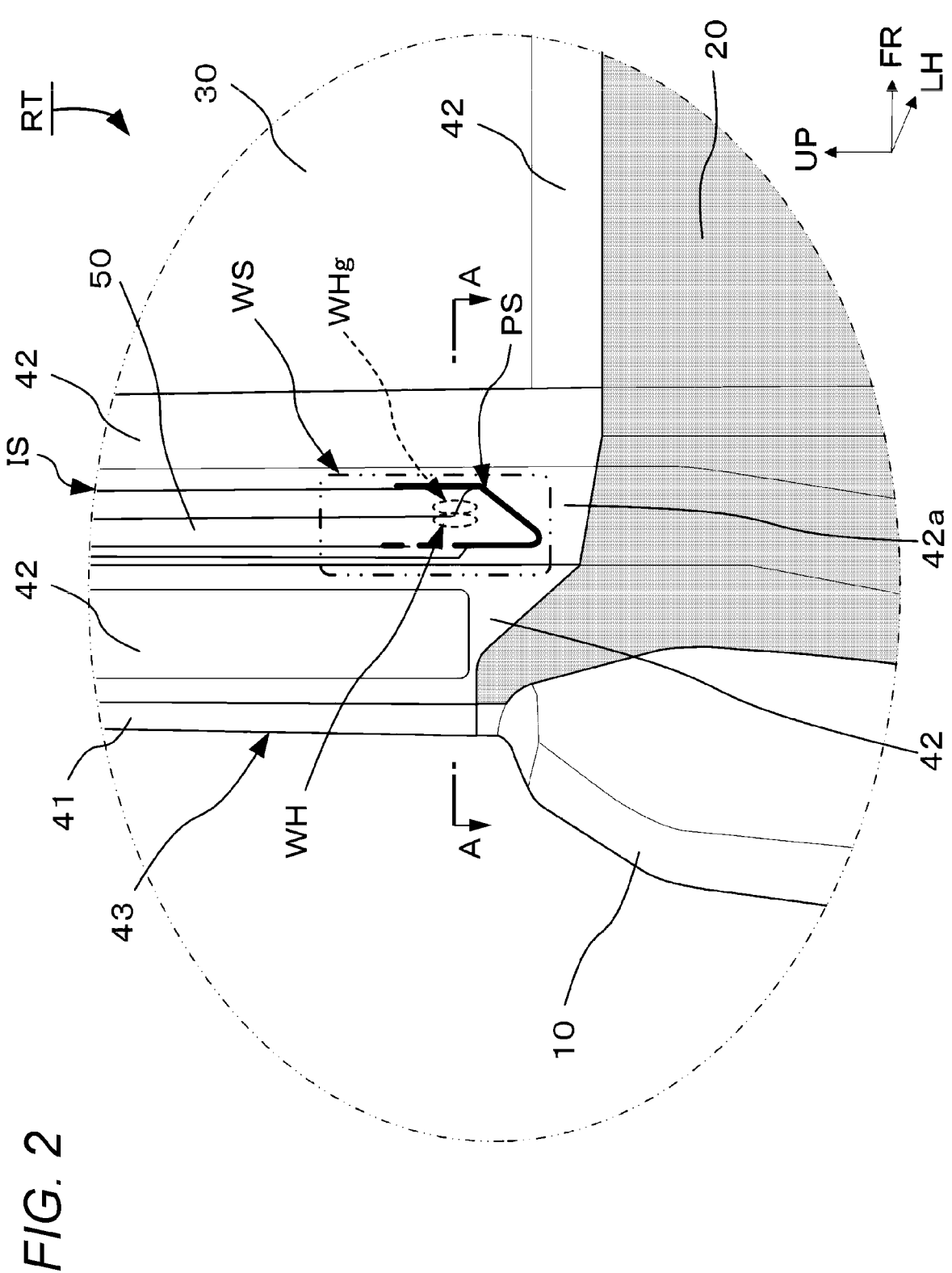
FIG. 2 is an enlarged perspective view of an RT part illustrated in FIG. 1 as viewed from inside in a vehicle rear and vehicle width direction.
Figure 3:
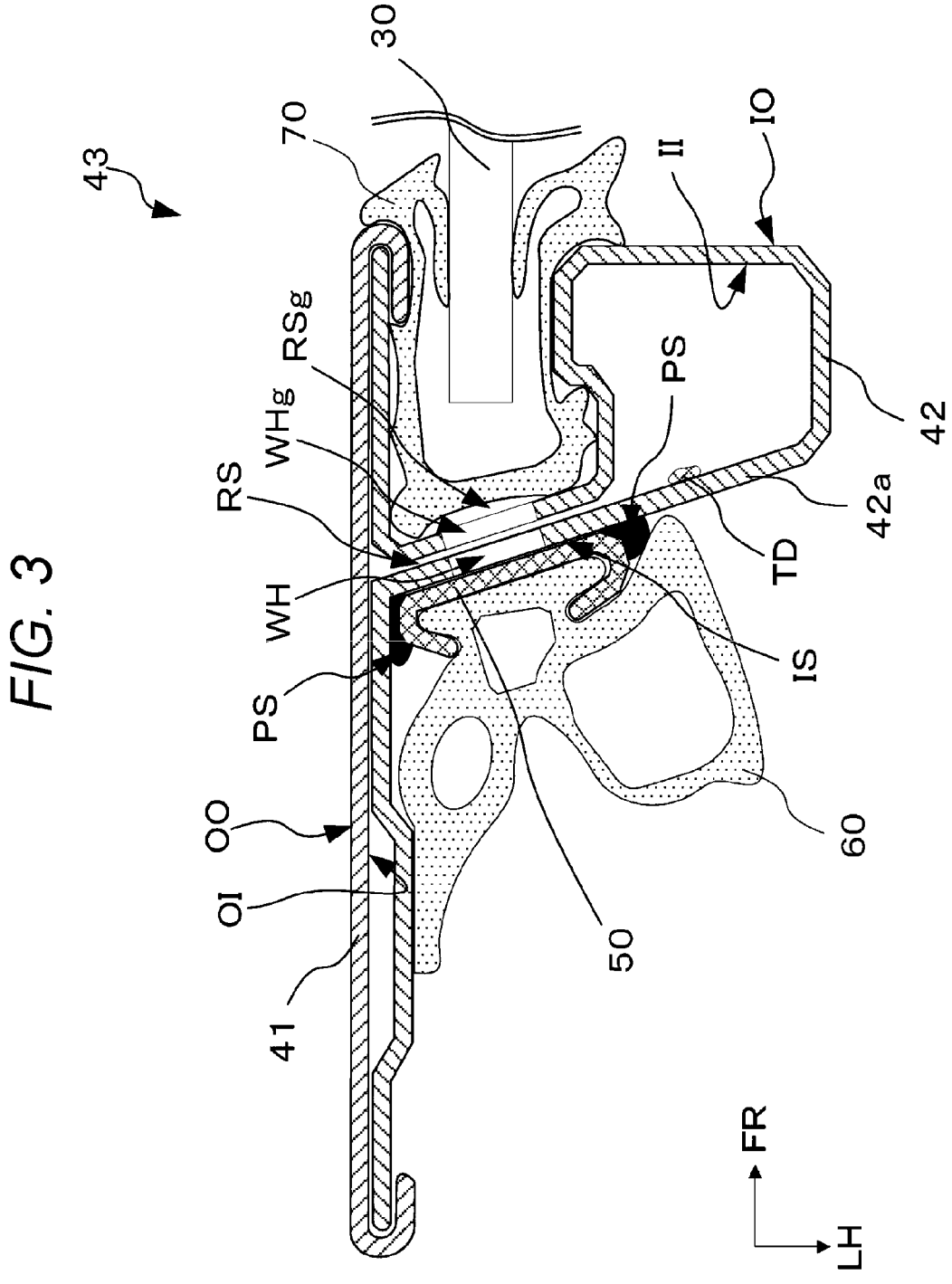
FIG. 3 is a cross-sectional view taken along line A-A illustrated in FIG. 2.

A configuration of the vehicle door 1 will be described with reference to FIGS. 1 to 4. Note that the vehicle door 1 mounted on the right side in front view of the vehicle V will be described as an example.
<Configuration of Vehicle Door 1>
As illustrated in FIG. 1, the vehicle door 1 includes an outer panel 10, an inner panel 20, a door window unit 30, a door sash part 40, a sash retainer 50, a weather strip part 60, and a glass run weather strip part 70.
(Outer Panel 10 and Inner Panel 20)
The outer panel 10 is a plate-like member constituting an outer plate of the vehicle door 1. In addition, the inner panel 20 is a plate-like member constituting an inner plate of the vehicle door 1, and is disposed inside the outer panel 10 in a vehicle width direction. The outer panel 10 and the inner panel 20 are formed by pressing a metal plate or the like.
The outer panel 10 and the inner panel 20 are combined with each other, and are coupled by welding or the like at respective ends in the vehicle front-rear and upper-lower directions.
Further, the outer panel 10 and the inner panel 20 are provided with a drain groove or a drain hole (not illustrated) for discharging water droplets and the like entering the inside to the outside.
(Door Window Unit 30)
The door window unit 30 is a plate-like tempered glass attached to be movable up and down in the vehicle door 1. In a state where the door window unit 30 is raised, the door sash part 40 described later is closed. In a side view of the vehicle V, a front end edge and a rear end edge of the door window unit 30 form a substantially trapezoid formed in accordance with the inclination of the door sash part 40.
(Door Sash Part 40)
The door sash part 40 is provided in a vehicle upper portion of the vehicle door 1 so as to surround the door window unit 30. The door sash part 40 is coupled to the outer panel 10 and the inner panel 20 by welding or the like.
The door sash part 40 includes an outer door sash part 41 and an inner door sash part 42. The outer door sash part 41 and the inner door sash part 42 are, for example, members processed by roll molding in which a long plate material such as a metal plate is bent stepwise to have a predetermined cross-sectional shape. Then, the door sash part 40 is formed by joining the outer door sash part 41 and the inner door sash part 42 by hemming or the like. A glass guide, a pillar, a design shape, a groove, a reinforcing rib, a clip fitting hole, and the like (not illustrated) are formed in the door sash part 40.
Further, the door sash part 40 forms a rear door sash part 43. As illustrated in FIG. 2, the rear door sash part 43 is formed by extending a vehicle rear side of the door sash part 40 in the vehicle upper-lower direction, and is joined to vehicle rear upper sides of the outer panel 10 and the inner panel 20 on a vehicle rear lower side of the door sash part 40.
In addition, in the door sash part 40, as illustrated in FIG. 3, an outer sash outer surface OO as an outer side surface in the vehicle width direction of the outer door sash part 41 and an inner sash outer surface IO as an inner side surface in the vehicle width direction of the inner door sash part 42 are formed as external appearance surfaces that are visible to human eyes. Further, in the door sash part 40, as inner surfaces formed by joining and being surrounded by the outer door sash part 41 and the inner door sash part 42, an outer sash inner surface OI of the outer door sash part 41 and an inner sash inner surface II of the inner door sash part 42 are formed as invisible surfaces.
Furthermore, inside the door sash part 40, an internal space RS formed by a space surrounded by the outer door sash part 41 and the inner door sash part 42 or a space surrounded by the inner door sash part 42 by bending or the like is formed. The internal space RS discharges a water droplet TD entering the internal space RS from the drain groove or the drain hole provided in the outer panel 10 and the inner panel 20 to the outside through the inside of the door panel formed by being surrounded by the outer panel 10 and the inner panel 20.
(Sash Retainer 50)
As illustrated in FIG. 2, the sash retainer 50 extends in the vehicle upper-lower direction and is fixed to an inner door sash surface 42a in surface contact therewith, and holds the weather strip part 60 (not illustrated in FIG. 2) to be described later. For example, the sash retainer 50 is coupled by welding or the like to the inner door sash surface 42a, which is a surface facing the vehicle rear side, of the inner door sash part 42 formed in the rear door sash part 43. The sash retainer 50 is formed by processing a metal plate or the like, and is provided with a foldback part for holding the weather strip part 60 from a vehicle upper end to a vehicle lower end of the sash retainer 50 at side portions on both sides in the vehicle width direction. A vehicle lower end of the sash retainer 50 is inclined from the outside in the vehicle width direction toward the inside and the upper side in the vehicle width direction.
As illustrated in FIG. 3, a minute space IS having a minute interval is formed between the sash retainer 50 and the inner door sash surface 42a. For example, the minute space IS is an unintended gap formed because the surfaces of the respective members are non-uniform when the inner sash outer surface IO of the inner door sash surface 42a and the sash retainer 50 are brought into contact and coupled. The minute space IS is formed on the inner sash outer surface IO which is an external appearance surface that is visible to human eyes.
In addition, a draining part WS (illustrated in a two-dot chain line in FIG. 2) is formed at the vehicle lower end of the sash retainer 50. Note that a configuration of the draining part WS will be described later.
(Weather Strip Part 60)
In order to prevent liquid, for example, rainwater or the like from entering the inside of the vehicle door 1 in the vehicle width direction, the weather strip part 60 is disposed to surround the periphery of the inside of the vehicle door 1 in the vehicle width direction from the inner panel 20 to the door sash part 40. The weather strip part 60 is molded from a soft resin, a rubber material, or the like, and is fitted and fixed to the foldback part provided in the sash retainer 50 in the sash retainer 50. Further, the weather strip part 60 is fixed by a clip or the like (not illustrated) in the inner door sash part 42 and the inner panel 20.
(Glass Run Weather Strip Part 70)
The glass run weather strip part 70 is molded from a soft resin, a rubber material, or the like, and is disposed so as to surround the periphery of the door window unit 30. The glass run weather strip part 70 has a U-shaped cross section so as to sandwich the door window unit 30 from both sides. The glass run weather strip part 70 is fixed to the inner door sash part 42 with a clip (not illustrated) or the like.

Further, in the glass run weather strip part 70, an internal space RSg is formed between the inner door sash part 42 and the glass run weather strip part 70 on an outer peripheral side not in contact with the door window unit 30.

<Configuration of Draining Part WS>

The configuration of the draining part WS will be described with reference to FIGS. 2 and 3.

As illustrated in FIG. 2, the draining part WS includes the door sash part 40, the sash retainer 50, a paint sealer PS, and a drain hole WH. For example, the draining part WS includes the inner door sash surface 42a, the sash retainer 50 coupled to a vehicle rear side of the inner door sash surface 42a by welding or the like, the paint sealer PS that closes a gap between the inner door sash surface 42a and the sash retainer 50, and drain holes WH and WHg provided on the inner door sash surface 42a side where an inner door sash part 50 and the inner door sash surface 42a.

(Paint Sealer PS)

The paint sealer PS is a resin or the like to be applied or supplemented to a joint, a small gap, or the like of an iron plate.

The paint sealer PS is continuously applied without a gap in a periphery of a vehicle lower side of the sash retainer 50 from the inner side in the vehicle width direction to the outer side in the vehicle width direction through the vehicle lower portion so as to close the space between the sash retainer 50 and the inner door sash surface 42a. For example, as indicated by a thick solid line and a thick chain line in FIG. 2, the paint sealer PS is applied in a vehicle lower end portion of the sash retainer 50 toward the lower side on an outer side in the vehicle width direction at a vehicle upper portion that is higher than the drain hole WH, passes through the vehicle lower end portion continuously without a gap, further extends upward on an inner side in the vehicle width direction, and reaches the vehicle upper portion from the drain hole WH provided in the inner door sash surface 42a.

Further, as illustrated in FIG. 3, the paint sealer PS is applied to a boundary part between the inner sash outer surface IO of the inner door sash surface 42a and the sash retainer 50 so as to fill a gap.

(Water Drain Holes WH and WHg)

The drain hole WH is, for example, a round hole provided in a vehicle lower portion of the inner door sash surface 42a of the internal space RS, and penetrates the inner door sash surface 42a from a vehicle rear side toward a vehicle front side. In other words, the drain hole WH penetrates toward the internal space RS formed by the inner sash inner surface II.

The drain hole WHg is formed in a shape in which the drain hole WH further penetrates the inner door sash part 42. The glass run weather strip part 70 is disposed on the vehicle front side of the drain hole WHg.

The drain hole WH and the drain hole WHg are formed so as to pass through the inner door sash surface 42a and the inner door sash part 42 in an overlapping state in front view from the front part of the vehicle and to pass toward the internal space RSg provided in the glass run weather strip part 70.

Further, the paint sealer PS is applied to both sides in the vehicle width direction and a vehicle lower side around the drain hole WH, and the drain hole WH is provided on the vehicle lower side that is lower than an application upper end of the paint sealer PS.

Operation and Effect

An operation of the door sash part 40 of the vehicle door 1 according to the present embodiment configured as described above will be described with reference to FIGS. 3 and 4.

In the door sash part 40, water droplets and the like are generated by rainwater, car wash water, dew condensation due to temperature change, and the like.

As illustrated in FIG. 3, in the outer door sash part 41, the water droplet TD enters the outer sash outer surface OO and the outer sash inner surface OI on the inner side in the vehicle width direction. The inner door sash part 42 enters the inner sash outer surface IO and the inner sash inner surface II. The water droplet TD enters the internal space RS formed by the inner door sash part 42 and the minute space IS formed as a contact surface between the inner door sash surface 42a and the sash retainer 50 due to a capillary phenomenon or the like.

When the water droplet TD enters the internal space RS, the water droplet TD goes toward the vehicle lower side inside the door sash part 40 surrounded by the inner door sash part 42 and moves to the inside of the vehicle door 1 surrounded by the outer panel 10 and the inner panel 20. Then, the water droplet TD is discharged to the outside of the vehicle V by the drainage groove or the drainage hole provided in the outer panel 10 and the inner panel 20.

Further, the internal space RS is a surface with which the inner sash inner surface II is in contact, and is a surface that is not visible to human eyes. Accordingly, even if the water droplet TD in the internal space RS is rust water containing rust, the water droplet TD moves through the inside not visible to human eyes and is discharged to the outside of the vehicle V, whereby the water droplet TD is discharged to the outside without staining the external appearance surface.

Figure 4:
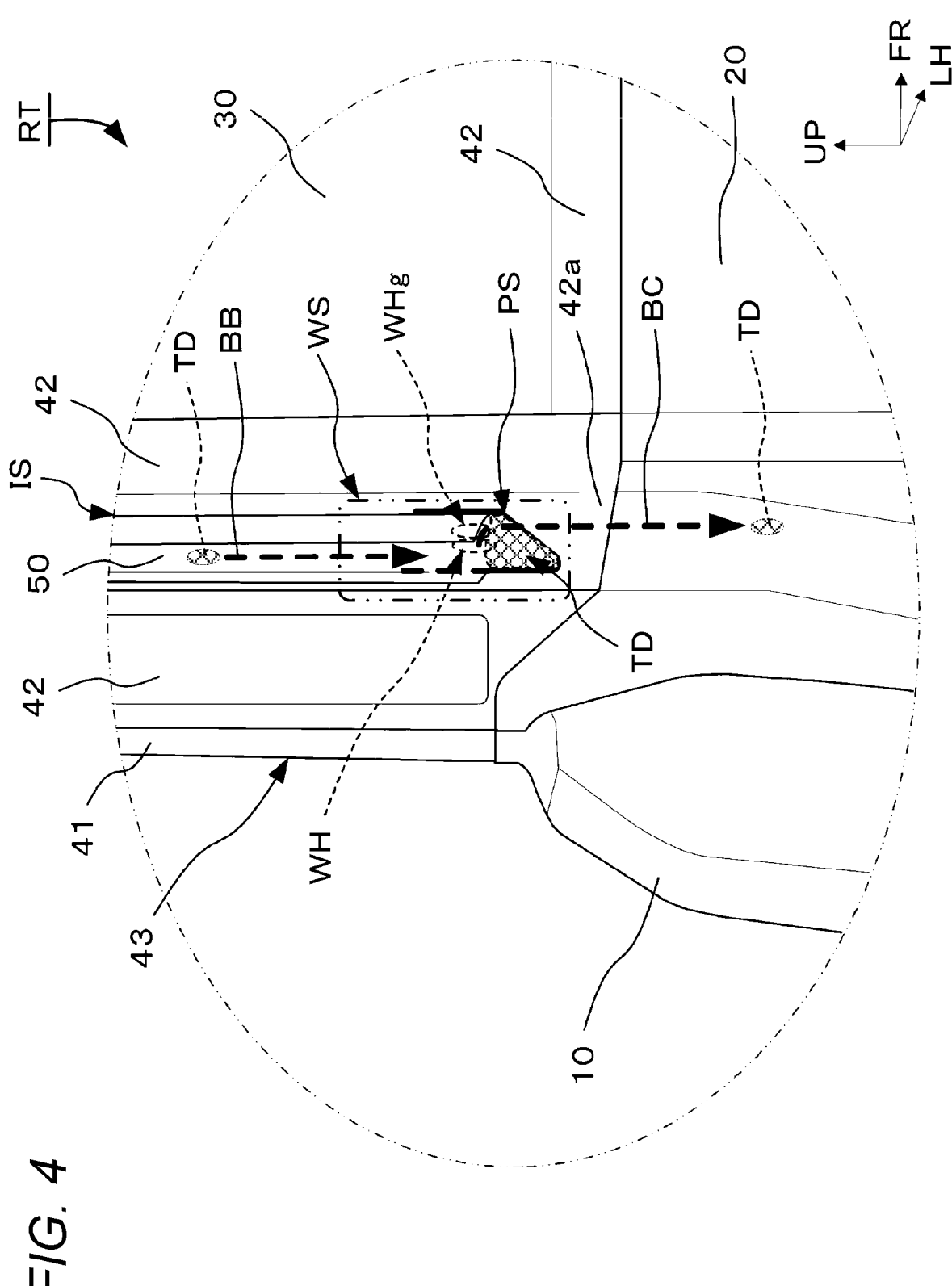
FIG. 4 is a perspective view illustrating a flow of a water droplet in an RT part illustrated in FIG. 2 as viewed from inside in a vehicle rear and vehicle width direction.

On the other hand, when the water droplet TD enters the minute space IS, as illustrated in FIG. 4, the water droplet TD moves toward the vehicle lower side between the inner door sash surface 42a and the sash retainer 50 as indicated by an arrow BB, and moves to the draining part WS provided in the lower portion of the minute space IS. The draining part WS is surrounded by the paint sealer PS, and the water droplet TD is stored in the draining part WS between the inner door sash surface 42a and the sash retainer 50.

As indicated by an arrow BC, the stored water droplets TD are drained from the drain hole WH provided in the inner door sash surface 42a on the vehicle lower side lower than the application upper end of the paint sealer PS, toward the internal space RS inside the inner door sash surface 42a. The internal space RS is a space surrounded by the inner sash inner surface II, and is a surface that is not visible to human eyes. Therefore, even if the water droplet TD in the internal space RS is rust water containing rust, the water droplet TD moves through the inside not visible to human eyes and is discharged to the outside of the vehicle V, whereby the water droplet TD is discharged to the outside without staining the external appearance surface.

In addition, when the water droplet TD overflows from the internal space RS, the water droplet TD passes through the drain hole WHg penetrating from the drain hole WH toward the internal space RSg and is drained to the internal space RSg provided in the glass run weather strip part 70. Then, the water droplet TD is discharged to the outside of the vehicle V from a drain groove or a drain hole provided in the outer panel 10 and the inner panel 20 via the internal space RSg.

As described above, the vehicle door 1 according to the present embodiment includes the door sash part 40 provided to surround the door window unit 30 in a vehicle upper portion of the vehicle door 1, and the sash retainer 50 that extends in the vehicle upper-lower direction and is fixed to the door sash part 40 in a surface contact manner, and holds the weather strip part 60 that prevents rainwater or the like from entering the inside of the vehicle door 1 in the vehicle width direction, in which in a periphery of a vehicle lower side of the sash retainer 50, the paint sealer PS is applied continuously without a gap from an inner side in the vehicle width direction to an outer side in the vehicle width direction through a vehicle lower portion in such a manner as to close the space between the sash retainer 50 and the door sash part 40, on a vehicle lower side that is lower than an application upper end of the paint sealer PS, a drain hole WH and a drain hole WHg are provided on a side of the door sash part 40 where both sides in the vehicle width direction and a vehicle lower side are surrounded by the paint sealer PS, and the door sash part 40 and the sash retainer 50 are in surface contact with each other.

That is, when the water droplet TD enters the minute space IS formed by the surface contact between the door sash part 40 and the sash retainer 50, the water droplet TD is stored in the draining part WS surrounded by the paint sealer PS. Then, the water droplet TD moves from the drain hole WH or the drain hole WHg provided in the draining part WS and penetrating toward the inner sash inner surface II to the internal space RS or the internal space RSg that is not visible. Accordingly, even when the water droplet TD stays inside for a long time and becomes rust water, the vehicle door 1 can discharge the water droplet TD from the internal space RS or the internal space RSg that is not visible without staining the external appearance surface. Therefore, it is possible to prevent the rust water from flowing out to the external appearance surface in the door sash part.

Note that although the drain hole WH is exemplified as a round hole as an embodiment of the disclosure, an elliptical shape, a long hole shape, or a rectangular slit may be used.

Further, although the sash retainer 50 is exemplified to be coupled to the inner door sash part 42 by welding or the like, the sash retainer may be integrally formed with the inner door sash part 42 by roll forming or the like.

Although the embodiment of the disclosure has been described in detail with reference to the drawings, the specific configuration is not limited to the embodiment, and includes a design and the like without departing from the gist of the disclosure.

The invention claimed is:

1. A vehicle door structure comprising:

a door sash part provided to surround a door window unit in a vehicle upper portion of a door of a vehicle; and a sash retainer extending in a vehicle upper-lower direction and a vehicle width direction of the vehicle, the sash retainer being fixed to the door sash part and having a surface that contacts with a surface of the door sash part, the sash retainer being configured to hold a weather strip part that prevents liquid from entering an inside of the vehicle more than the vehicle door from an outside of the vehicle in the vehicle width direction, wherein a paint sealer is applied to a periphery of a vehicle lower side of the sash retainer continuously without a gap from an inner side of the periphery in the vehicle width direction to an outer side of the periphery in the vehicle width direction through a vehicle lower portion of the periphery in such a manner as to close a space between the sash retainer and the door sash part, the door sash part has a region that is lower than an application upper end of the paint sealer, the region having both sides in the vehicle width direction and a vehicle lower side that are surrounded by the paint sealer, the region being disposed in surface-to-surface contact with the sash retainer, and a drain hole configured to drain liquid is provided on the region.

* * * * *